US009219752B2

(12) United States Patent
Balinsky et al.

(10) Patent No.: US 9,219,752 B2
(45) Date of Patent: Dec. 22, 2015

(54) DATA LEAK PREVENTION SYSTEMS AND METHODS

(75) Inventors: Helen Balinsky, Cardiff Wales (GB);
Steven J Simske, Fort Collins, CO (US);
David Subiros Perez, Wellington Hill (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 17 days.

(21) Appl. No.: 14/126,700

(22) PCT Filed: Aug. 26, 2011

(86) PCT No.: PCT/US2011/049314
§ 371 (c)(1),
(2), (4) Date: Dec. 16, 2013

(87) PCT Pub. No.: WO2013/032422
PCT Pub. Date: Mar. 7, 2013

(65) Prior Publication Data
US 2014/0165137 A1    Jun. 12, 2014

(51) Int. Cl.
*H04K 1/00*      (2006.01)
*H04L 29/06*     (2006.01)
(Continued)

(52) U.S. Cl.
CPC ............... *H04L 63/20* (2013.01); *G06F 21/53* (2013.01); *G06F 21/554* (2013.01); *G06F 21/6245* (2013.01)

(58) Field of Classification Search
CPC ..... G06F 21/554; G06F 21/00; G06F 21/575; H04L 63/20; H04L 63/105; H04L 63/108; H04L 29/0685; H04L 41/0803
See application file for complete search history.

(56) References Cited

U.S. PATENT DOCUMENTS 5,974,549 A * 10/1999 Golan .................... G06F 9/468
714/47.3
7,035,850 B2 * 4/2006 Arai et al. ........... G06F 21/6218
(Continued)

FOREIGN PATENT DOCUMENTS

JP    2004-139292 A    5/2004
JP    2005-071071 A    3/2005

OTHER PUBLICATIONS

Chari Parampaiii, C. et al., "A Practical Mimicry Attack Against Powerful System-call Monitors", ASIACCS '08, Mar. 18-20, Tokyo, Japan.
(Continued)

*Primary Examiner* — Dede Zecher
*Assistant Examiner* — Trang Doan
(74) *Attorney, Agent, or Firm* — Dierker & Associates, P.C.

(57) ABSTRACT

A data leak prevention system includes an application, having source code that is unavailable or non-modifiable, resident on a client device. A system call is emittable by the application as a result of an action, and is to take place before a data leak event can occur. The action involves a document and i) latest full contents of the document, ii) metadata of the document, or iii) a combination of the latest full contents and the metadata. A system call interceptor agent is also resident on the client device. The interceptor agent includes a system call interceptor to intercept the system call emitted by the application and to suspend the system call. The system also includes a policy decision engine to analyze at least some of i) the latest full contents, ii) the metadata, or iii) the combination, and implement a policy action based upon the analysis.

19 Claims, 4 Drawing Sheets

(51) Int. Cl.
*G06F 21/55* (2013.01)
*G06F 21/53* (2013.01)
*G06F 21/62* (2013.01)
G06F 11/00 (2006.01)
G06F 7/04 (2006.01)

(56) References Cited

U.S. PATENT DOCUMENTS

| | | | |
|---|---|---|---|
| 7,886,148 | B2 | 2/2011 | Kiriansky et al. |
| 8,099,596 | B1* | 1/2012 | Rusakov ............... G06F 21/53 713/2 |
| 8,290,763 | B1* | 10/2012 | Zhang .................. G06F 9/455 703/26 |
| 8,365,243 | B1* | 1/2013 | Lu ......................... G06F 21/10 380/287 |
| 8,499,152 | B1* | 7/2013 | Chen .................... H04L 63/102 713/155 |
| 2005/0091536 | A1* | 4/2005 | Whitmer ................ G06F 21/53 726/4 |
| 2005/0262132 | A1 | 11/2005 | Morita et al. |
| 2006/0075492 | A1* | 4/2006 | Golan ................... G06F 21/55 726/22 |
| 2006/0161982 | A1 | 7/2006 | Chari et al. |
| 2008/0016339 | A1 | 1/2008 | Shukla |
| 2009/0126017 | A1* | 5/2009 | Chahal .................. G06F 21/54 726/23 |
| 2011/0209151 | A1* | 8/2011 | Chung ................... G06F 9/466 718/101 |
| 2011/0213845 | A1* | 9/2011 | Logan .................. G06Q 10/107 709/206 |
| 2011/0302400 | A1* | 12/2011 | Maino ................. G06F 21/575 713/2 |
| 2012/0054490 | A1* | 3/2012 | Rosu .................... H04W 4/003 713/165 |
| 2012/0079469 | A1* | 3/2012 | Gonion .................. G06F 8/456 717/160 |
| 2013/0111593 | A1* | 5/2013 | Shankar ................ G06F 21/54 726/25 |

OTHER PUBLICATIONS

Payer, M. et al., "Fine-grained User-space Security Through Virtualization", VEE'11, Mar. 9-11, 2011, Newport Beach, California, USA, ACM 978-1-4503-0501-3/11/03.

* cited by examiner

DATA LEAK PREVENTION SYSTEMS AND METHODS

BACKGROUND

The present disclosure relates generally to data leak prevention systems and methods.

Electronic data communication is ubiquitous. Business practices and commerce often require data to be transmitted securely, such that customer, internal business, and/or legal standards are met. One goal of these standards is to prevent the unauthorized transmission of information and attachments. In attempts to achieve this goal, policies have been implemented that require labels and tags, such as "private", "confidential", "restricted", "sensitive", and the like to be added to various documents and data transmissions. Other policies require keywords to be included in the actual document contents (e.g., persistent terminology that distinguishes one class of sensitive documents from another class of sensitive documents). Ensuring that these policies are effected may be difficult, at least in part because of differing levels of employee competence (e.g., new to company, job, or role; temporary replacement), genuine mistakes (e.g., distraction, forgetfulness, lack of concentration), or a lack of up to date corporate, legal, or other policy information. Policy changes may require an adequate employee training which is delivered in parallel with or shortly after the changes have been made. It is possible, however, that there could be a delay between the desired policy change and the actual roll-out. When policies are not enforced, sensitive data/information may be leaked. Data leak incidents range from, for example, sending a sensitive e-mail to the wrong address to uploading a confidential document instead of a conference submission; and from saving an unprotected document backup on a USB device to printing a sensitive document on a widely accessible printer and then forgetting that the document was printed. Methods used to prevent data leaks include, for example, analysis of outgoing information on gateway-based systems, secure erasure solutions, and USB lock-out and mandatory encryption solutions. The existing methods are office-based leak prevention mechanisms that may not be suitable for data leaks from out-of-office devices (e.g., DVD, USB, external hard drives, etc.).

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

In the examples disclosed herein, sensitive data policy enforcement occurs locally on devices that are part of a trusted environment. These devices may range from desktop computers (an example of an in-office device) to mobile phones (an example of an out-of-office device). At least part of the system disclosed herein is resident on the device and captures system calls emitted by an application whose source code is not available or is not modifiable (e.g., due to practical or legal considerations). This type of application is often a third party application that has been installed on the device, and is not designed to handle sensitive data in accordance with policies set for the trusted environment. The system and method disclosed herein sandbox such applications in order to prevent policy breaches and data leaks from occurring. Sandboxing involves evaluating dynamically changing document sensitivity based on actual document contents and/or document metadata and then-current policies before the document is allowed to be exported out of a trusted environment. The evaluating takes place when a user attempts to export the document out of the trusted environment. As such, system and method disclosed herein are designed to prevent sensitive data leaks by thwarting sensitive data export from a trusted environment before the exporting has a chance to occur.

The program to achieve sensitive data policy enforcement may be installed in a secure compartment/account on the user's device. The program may be deployed in an advisory mode or a mandatory mode. Advisory mode provides a safety net to prevent accidental user error, and the policy enforcement solution/program is deployed for the user's benefit. Mandatory mode means that the policy enforcement solution/program cannot be accessed, modified, or disabled by the user.

Examples of the system and method disclosed herein automatically detect, and in some instances amend potential policy breaching user actions at the intention stage, i.e., as a corresponding system call is called by an application resident on the user's device, but before the action associated with the system call has been accomplished. Prior to deployment of the method to actually prevent data leaks from occurring, the application whose source code is not available or non-modifiable is analyzed to catalog systems calls of the application, and to minimize the system calls of the application that are captured to a set of system call(s) associated with sensitive tasks where data leak prevention is desired. The analysis of the application is shown in FIG. 1.

Figure 1:
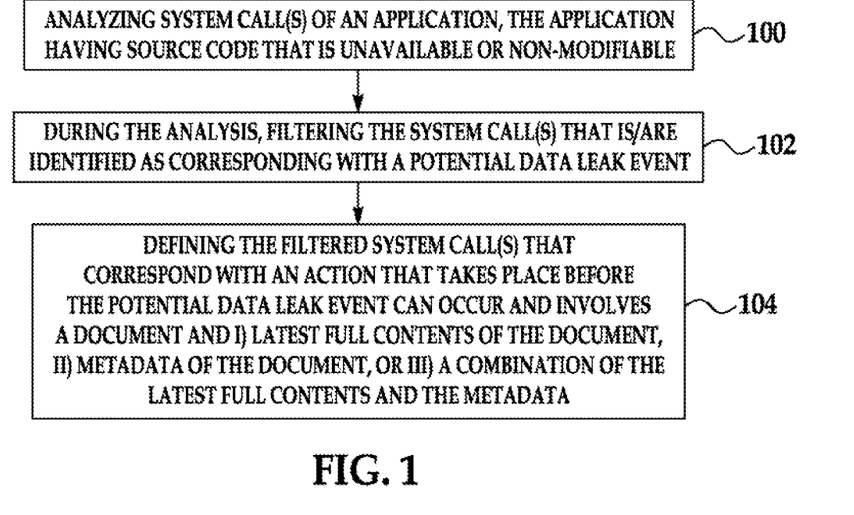
FIG. 1 is a flow diagram depicting an example of a data leak prevention method.

Each of the steps outlined in FIG. 1 is performed using hardware, firmware, and software (i.e., computer readable instructions). In an example, the hardware (e.g., a processor resident on a local/client device) runs computer readable instructions (i.e., software) that are embedded on some non-transitory, tangible computer readable medium.

At the outset, a system call that is emitted by the application is captured and is analyzed (see reference numeral 100 in FIG. 1). In an example, all system calls that are emitted by the application may be captured and analyzed. While all of the system calls can be captured and analyzed, in some instances, it may not be desirable to capture and analyze all of the system calls. For example, the computer readable instructions performing the analysis of the application may be programmed to recognize that certain system calls (e.g., "open", "new", etc.) are not at all related to potential data leak events, and thus these system calls would not be captured and analyzed. In some examples, system calls that are triggered by a corresponding action that has a potential to leak data are filtered. In these examples then, any system call that is associated with an action that can potentially leak data from the trusted environment is captured. In one example, StraceNT (i.e., the Windows analog of an original Linux tool) may be used to intercept and record system calls for subsequent analysis. The filtering process may also be performed manually or via some automation tool in order to identify the system call(s) that correspond with potential data leaking actions.

During the analysis of the captured system calls, those system calls (e.g., a single call or a group of calls) that are identified as corresponding with or being related to a potential data leak event are filtered out (see reference numeral 102 in FIG. 1). As used herein, "potential data leak events" or "data leak events" are actions that can result in sensitive data being transmitted out of the trusted environment. Included actions are those that are able to export policy recognized data out of the trusted environment. It is to be understood that exporting data may be accomplished via any channel, for example, through saving, electronic mailing, printing, copying, moving, dragging and dropping, uploading, or the like.

The action(s) may be triggered by a user of the application and client device, and these action(s) is/are referred to herein as user action(s). Examples of user actions include pushing a button to save a document, to send an electronic mail (e-mail), to upload a document, to print a document, and to copy or move a document (e.g., using Microsoft Windows Explorer). Saving may be a data leak event when, for example, sensitive data is saved in clear text onto an external device, such as a pen drive, a USB key, an external hard drive, or the like, and the external device is then lost. Saving may also be a data leak event when, for example, the sensitive data is saved on a remote network drive, which may have a low security status or may be widely accessible. Sending an e-mail may be a data leak event when, for example, a user accidentally sends a confidential e-mail to an unintended recipient or an unintentionally wide audience, or a user sends a confidential e-mail to the correct recipient through a public network in clear text. Uploading a file may be a data leak event when, for example, the wrong file, which contains sensitive data, is accidentally uploaded to a public server instead of the originally intended file, which does not contain sensitive data. Printing may be a data leak event when, for example, a confidential or otherwise sensitive document is printed on a widely/publicly accessible printer without enabling personal identification number (PIN) retrieval and then the document is forgotten about or left unattended.

The action(s) may also be triggered by internal application processes (i.e., an internal state of the application), and these action(s) is/are referred to herein as application action(s). An example of an application action is when Microsoft Outlook sends a delayed or scheduled e-mail message (e.g., a user may select the desired delivery date and time in the menu "Options" under sub-menu "Delivery options"). Another example of an application action is when Microsoft Word performs an "AutoSave". Yet another example of an application action is when the application is programmed to automatically upload some information to a remote web-site.

When filtering is performed, the computer readable instructions are programmed to analyze each captured system call and determine whether the captured system call(s), uniquely or as part of a group, correspond with the potential data leak event (see reference numeral 104 of FIG. 1). The system call(s) that are deemed unrelated to potential data leak events are not filtered out and are not subjected to any further analysis.

In contrast, those system call(s) that are filtered out during the initial analysis are subjected to further processes to define which of the filtered system call(s) correspond with a particular action that, if fully executed, could leak data from the trusted environment (see again reference numeral 104 of FIG. 1). More particularly, the system determines which of the filtered-out system calls correspond with actions that i) take place before the data leak event can occur, and ii) involve the latest version of a document (including its latest full contents and/or its metadata). Defining is accomplished by first identifying from the filtered system call(s) either a single call or a group of calls that is/are responsible for actually performing the action; and then selecting from the identified system call(s), the system call(s) or other means that provide access to the latest (i.e., most recent, then-current) version of the document (i.e., contents and/or metadata). To prevent a data leak from occurring, the system call(s) responsible for the action is/are temporarily blocked (i.e., suspended while analyzing takes place), and the resulting behavior of the application is observed. The application's behavior in response to blocked/suspended system call(s) identifies the lowest level system call or combination of calls that prevents the action from being executed (as opposed to not or only partially suspending the action). In other words, the very last system call(s) or the most convenient system call(s) whose context provides access to the latest document contents and/or metadata that occur before the action has the chance to occur are identified. The application's behavior in response to blocked/suspended system call(s) also identifies the system call that provides the latest version of the document (as opposed to, for example, only a document fragment). For example, a system call that is responsible for writing only a portion of a document, or a system call that occurs after a portion of a document has already been written to a remote drive may not be used, at least in part because the first system call does not provide the full document context and the second system call occurs too late (i.e., after some sensitive may have already leaked). In other words and in some instances, the system call(s) that involve the most recent version of the document are identified and defined as corresponding with the potential data leak event. It is to be understood, however, that other means may be deployed to recover the corresponding document contents involved in a potential data leak event. If the full document contents cannot be retrieved for a particular application and action from the corresponding action blocking system call, the latest document contents can be recovered using other means, for example, the document contents may be routinely cached during document modifying operations such that the latest is available for the evaluation when the action blocking system call is suspended.

FIG. 1 illustrates the analysis of the application 12 to determine which system calls(s) are called by the application 12 when potential data leak events are about to occur, and to select those system call(s) which effectively prevent the data leak event from occurring while providing the full document contents and/or metadata. While not shown in FIG. 1, it is to be understood that for the policy defined or specified system call(s), the client device 14 may perform a detour function. In an example, a detour function may be performed for every suspicious/suspended system call found during the analysis to determine, for example, which system call(s) are easiest and/or safest to detour, and/or most suitable for attaching/executing a desired policy action. In some examples during the analysis, the potential data leak event may be simulated and the detour function implemented and tested in order to improve the detour function when it is used during deployment. The detour function may involve suspending the system call(s), and while the analysis is taking place, notifying the user, for example, that the system call(s) have been temporarily blocked, that an analysis is taking place, or that the application will resume momentarily. The communications sent to the user may depend upon the deployment scenario.

When testing multiple system calls, the calls may be blocked one by one, or in groups. System call(s) that are identified as performing/preventing the action and as being associated with the latest version of the document are added to the set of system calls for the particular action. As such, the set includes the minimum necessary system call(s) associated with the particular action. As will be described further hereinbelow, the emission of any system call within the set during application use triggers a series of processes to prevent data leakages from occurring.

Table 1 provides examples of actions, applications, and system calls that are part of a set for the particular action and a particular application. In addition to traditional system calls (e.g., writefile, replacefile, etc.), the system and method disclosed herein may be augmented by using application add-ons, plug-ins, etc. as "system calls". As shown in Table 1, higher level calls, such as events from Outlook MAPI (e.g., fnevCreated) or Browser Helper Object (BHO) events (e.g., BeforeNavigate2) may be designated as system call(s) for a particular action. The Browser Helper Object is a DLL module designed as a plugin for Microsoft's Internet Explorer web browser to provide added functionality. For example, with BHOs, one can write components that Internet Explorer will load each time it starts up. BHOs run in the same memory context as the browser and can perform any action on the available windows and modules.

TABLE 1

| Action | Application | System Call(s) to Capture |
|---|---|---|
| Save File | Microsoft Word | WriteFile |
| | | ReplaceFile |
| | Microsoft Excel | WriteFile |
| | | ReplaceFile |
| | Microsoft PowerPoint | WriteFile |
| | Acrobat Reader | WriteFile |
| | Notepad | WriteFile |
| Send Email | Microsoft Outlook | fnevCreated |
| | Web Based | BeforeNavigate2 |
| Upload File | Internet Explorer | BeforeNavigate2 |
| Print | Notepad | WriteFile |
| | | WritePrinter |
| | Microsoft Word | WriteFile |
| | | WritePrinter |

As mentioned above, the method shown in FIG. 1 may be performed for any application whose source code is unavailable and/or non-modifiable. System calls used by different applications, even for seemingly identical user actions, depend upon internal application behavior and its actual implementation. Therefore, system calls corresponding with the save file action in Microsoft Word may be different from the system calls corresponding with the save file action in Notepad. As such, it may be desirable that a set of system call(s) be generated for each application and for each data leak event of each application.

Figure 2:
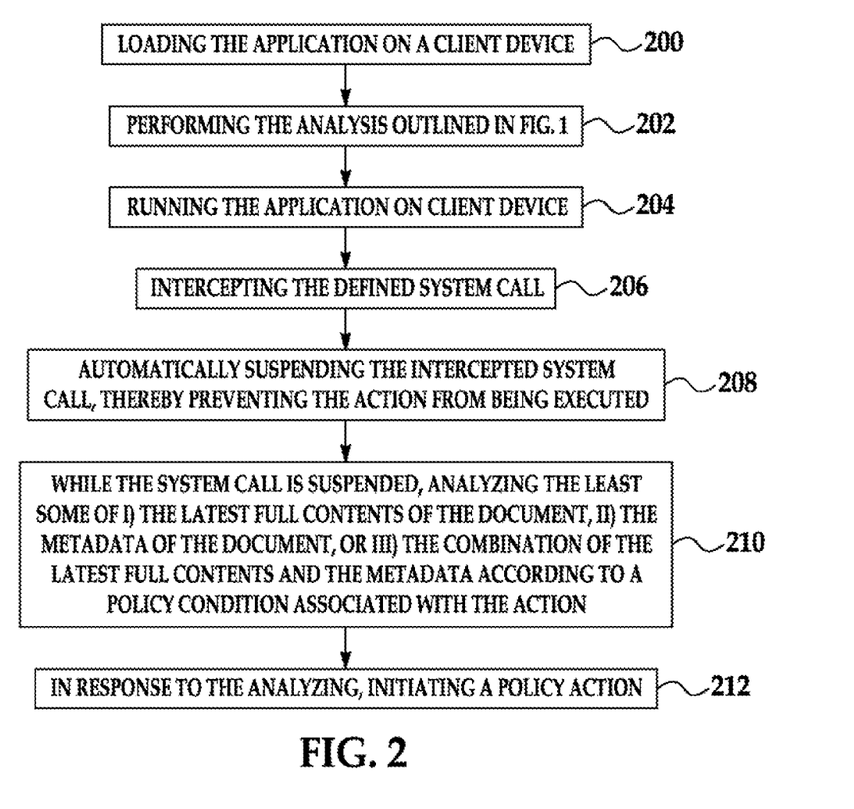
FIG. 2 is a flow diagram depicting another example of a data leak prevention method.
Figure 3:
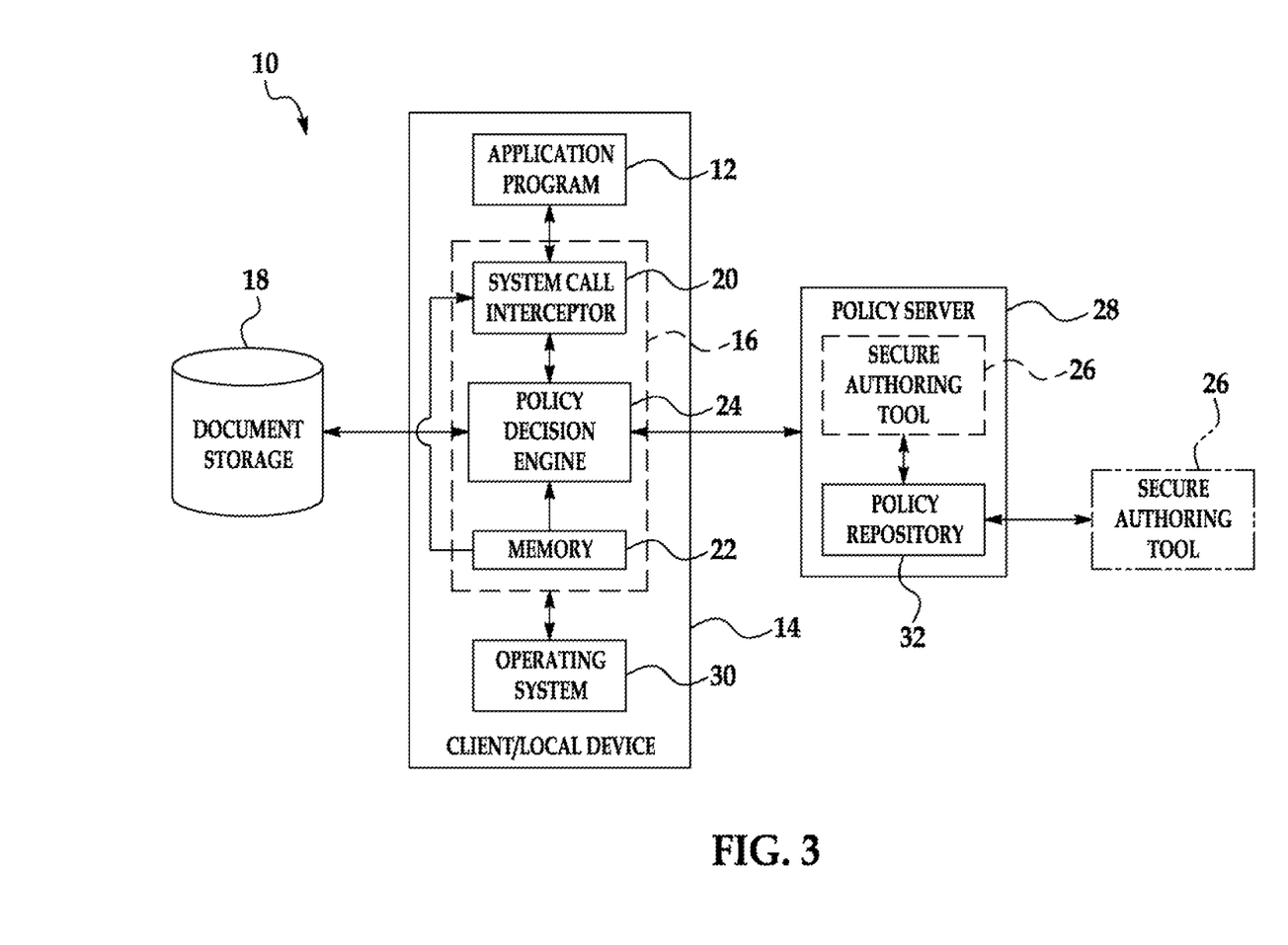
FIG. 3 is a schematic illustration of an example of a data leak prevention system.

FIG. 2 illustrates an example of the data leak prevention method, which includes both the analysis of the application and the actual deployment after the analysis of the application has taken place. Throughout the description of FIG. 2, components of the systems 10 and 10' shown in FIGS. 3 and 4 may be referenced and described.

At the outset of the method shown in FIG. 2 (as shown at reference numeral 200), the application 12 is loaded onto the local or client device 14, 14'. The local or client device 14, 14' may be an out-of-intranet device or a peripheral device. Out-of-intranet devices include any company-owned mobile device (e.g., laptops, smart phones, etc.) that can potentially carry sensitive information and can be used either inside or outside of a secure/trusted environment. A peripheral device is one that is or can be connected to the company intranet, such as an unprotected drive, USB or other memory device, a publically accessible printer, or the like.

In the examples disclosed herein, the application 12 is an application that is useful to the user, but is not designed to handle sensitive data in accordance with a policy set forth for the user, document, etc. The source code of the application 12 is not available or is not modifiable. With this type of application 12, the accidental or intentional cross-contamination of sensitive data can occur as a result of sensitive data being opened using the application 12 or by sensitive data being copied into the application 12. Due to the initial inability of the application 12 to handle sensitive data, the sandboxing method described in FIG. 1 is performed to better equip the application 12 for handling sensitive data and for preventing data leaks (see reference numeral 202 of FIG. 2). To briefly reiterate from above, the analysis of FIG. 1 generates a set of system calls (which may include one system call or a group of system calls) for a particular action, where the system call occurs before any data exportation associated with the action occurs and at the same time provides a document and its full contents and/or metadata.

As used herein, the term "document" includes text, media, video, audio, files, labels, tags, elements, phrases, patterns, programs, network data, packet streams, signal transmissions, records, emails, and data of any type. The "contents" of the document include the latest data (e.g., final edits) incorporated into the document before the action (which could leak data if completed) is initiated. The document may also include the latest document metadata.

When the application 12 is run on the local device 14, 14' (reference numeral 204 of FIG. 2), a system call interceptor agent 16 is also run in the background to intercept the defined system call(s) during each use of the application 12. The system call interceptor agent 16 is resident on the local device 14, 14' and includes hardware and computer readable instructions that are executable by at least some of the hardware. In one example, the hardware of the system call interceptor agent 16 includes the processor of the client device 14, 14'. The configuration of the system call interceptor agent 16 is based, at least in part, upon the link between the action and the system call(s) for the different applications 12. It is to be understood that the system calls provide an interface between a user level process (e.g., running the application) and the operating system 30 of the client/local device 14, 14'. As described hereinabove, higher levels calls to DLLs (dynamic-link libraries), APIs (application programming interfaces), or other components (BHOs) are included as "system calls" in the present disclosure. Different operating systems 30 may have different interfaces, which depend, at least in part, on the operating system 30 architecture, structure and implementation. As such, different versions of the system call interceptor agent 16 may be utilized with different operating systems 30.

In some examples, the interceptor agent 16 includes a system call interceptor 20 that scans the system calls that are emitted by the application 12. System calls are emitted when corresponding actions are initiated manually by the user of the device 14, 14', or automatically by the application 12. The system call interceptor 20 is programmed to scan for then-currently emitted system call(s) and to capture those system call(s) that had previously been assigned to a set of system calls for a particular action (see reference numeral 206 of FIG. 2). As such, the system call interceptor 20 listens to what the application 12 is trying to do (i.e., what system call(s) it makes), and if the application 12 tries to effect any action that the system call interceptor 20 is programmed to detect, then the system call interceptor 20 captures or intercepts the request. For example, the system call interceptor 20 may scan all system calls emitted by an application, but may only capture/intercept those system call(s) that is/are part of the set designated for the actions of printing, saving, uploading, copying, moving, dragging and dropping, or emailing. The set of system calls for the particular action (which is/are identified by the method shown in FIG. 1) may be stored, for example, in a memory 22 of the local device 14, 14'. Since only system call(s) that had previously been assigned to the set of system calls are captured, computational overhead of the interceptor agent 16 is minimized.

When the system call interceptor 20 captures system call(s) of a previously defined set, it suspends the system call(s) from being executed, and thus prevents the action associated with the system call(s) from being executed (reference numeral 208 of FIG. 2). For example, when an associated system call is captured, the action of printing, emailing, saving, moving, copying, dragging and dropping, or uploading is prevented from being executed. The system call(s) is/are the call(s) from the application to the operating system 30 that request/instruct the operating system 30 to perform the action. Interceptor 20 suspends the system call(s) from the application 12 before they reach the operating system 30. Therefore, as a result of suspending, the operating system 30 does not receive the request and thus the intended action is not executed.

While the system call(s) is/are suspended, a policy decision engine 24 (which in some instances—see, e.g., FIGS. 3 and 4—is part of the interceptor agent 16) is programmed to scan and perform deep content parsing of a set of predetermined structured and/or unstructured fields within the document that is associated with the action. In other words, the policy decision engine 24 looks inside the document and unravels the document's contents and/or metadata (see reference numeral 210 of FIG. 2). The contents and/or metadata of the document are analyzed to determine the document sensitivity and to determine whether a policy applies to the document that is attempted to be exported from the local device 14, 14'. The policy decision engine 24 may be programmed to successfully operate in real time, and to minimize the time it blocks the application 12 while the application 12 is being suspended and the user is waiting. In other words, the policy decision engine 24 is programmed to quickly determine whether the action in question may be continued. It is to be further understood that the overall internal system call interception framework is programmed so that the suspended system call(s) does/do not destabilize and/or crash the application 12.

The policy decision engine 24 performs some detour function for every suspicious/suspended system call so that the document and/or data analysis may be performed to determine if a data leak will occur if the action is continued, and so that the engine 24 can determine (based upon the analysis) which policy action to implement.

Different policies may be in place for different actions, such as printing, saving, uploading, emailing, etc. In some instances, policies may be coherent. For example, if a document is not allowed to be e-mailed to an external address, it may also not be allowed to be uploaded to an external server. The policies are generated and updated using a secure authoring tool 26, which, in some examples, is part of a policy server 28 (shown in FIG. 3), and in other examples, is part of the client device 14, 14' (shown in FIG. 4), and in still other examples, is part of a trusted server/service 34 (shown in FIG. 5). When part of the policy server 28 or trusted server/service 34, the secure authoring tool 26 may be resident on a remote device (e.g., a central server, a distributed server with or without localization, a hybrid central/distributed server, etc.) that is in selective communication with the local device 14 (or 14"), or the tool 26 may be resident on a server of a cloud computing system that is in selective communication with the local device 14 (or 14").

Figure 4:
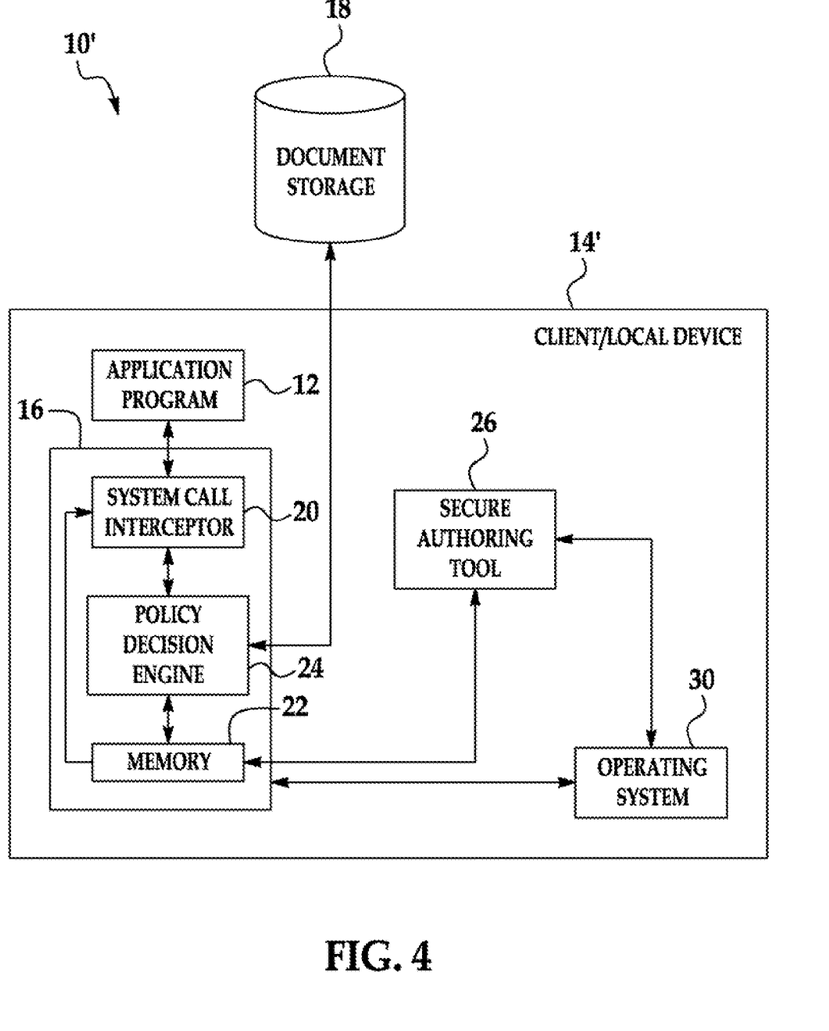
FIG. 4 is a schematic illustration of another example of data leak prevention system.

In some examples, the policy server 28 or trusted server/service 34 may be an organization-wide service, which may be a single server or a cluster of synchronized servers that provide reliable access through redundancy. Any of these off-board (i.e., not resident on the device 14') policy servers 28 or trusted server/service 34 includes a policy repository 32 for storing policies. In the example shown in FIG. 3, the policy repository 32 may be in selective communication with the memory 22 of the client device 14, and two components 22, 32 may synchronize on a schedule or when needed. As one example, the policy repository 32 may push new and/or updated policies to the memory 22 of the client device 14 upon creation/modification. In contrast, when the secure authoring tool 26 is part of the local device 14', the secure authoring tool 26 may be loaded as a program on the local device 14'. The policies generated from the on-board secure authoring tool 26 (as shown in FIG. 4) may be stored directly in the memory 22. When a trusted server/service 34 is utilized, the secure authoring tool 26 may be part of the server/service 34 and may transmit policies to a repository 32 and/or a decision engine 24 that are also part of the server/service 34.

Depending upon who has access to the secure authoring tool 26, policies may be created, changed, updated, deleted, managed, tested, reviewed, etc. by a policy manager, system administrator or the user of the local device 14, 14', 14". As examples, an administrator may define policies for users in a multi-user environment, and a user may implement his/her own safeguard policies (local to his/her device 14, 14') to protect himself/herself from making mistakes when working with multiple applications. The secure authoring tool 26 is responsive to input received either manually from an individual or in an automated form from another program. The secure authoring tool 26 is used to create a customizable set of policies applicable to documents and/or data that are associated with particular actions. It is to be understood that any number of policies can be created.

The policy may include, at least, a policy identifier (consisting of a unique policy identifier and a policy revision version (i.e., sequentially numbered policy updates)); the action associated with the system call(s) to be captured; a policy condition that the document contents and/or its metadata must satisfy for the policy to become applicable; and a policy action that will be implemented if the policy condition is satisfied. A single policy may include multiple policy conditions and/or multiple policy actions. In an example, if a set of policy actions is included in a single policy, one action may be implemented when the policy condition is satisfied and another action may be implemented when the policy condition is not satisfied. Each of the policy components will be further described hereinbelow.

As mentioned above, while the action is suspended, the policy decision engine 24 performs a deep scan (as defined by corresponding policy conditions) of the document that is associated with the action to determine if a policy applies. The policy decision engine 24 may retrieve the document contents and/or metadata from the document storage 18. The document storage 18 may include local or network storage, a hard drive, removable media, and the like. When performing a scan, the policy decision engine 24 may retrieve policies associated with the particular action from the policy repository/storage 32 and/or the memory 22.

The sensitivity of the document is a dynamic property which depends upon the current state of the document's contents and metadata and the current state of the policies. For example, document sensitivity can be altered as the document is being edited (e.g., sensitive data can be typed, pasted, added into, removed from the document), as policies are changed (e.g., a document could satisfy a newly-added policy, or no longer satisfy an amended version of an existing policy), or as time-dependent policy conditions expire. As such, it is desirable to determine the document sensitivity at the latest point before exporting the document out of the local device 14, 14'. In the examples disclosed herein, real-time document sensitivity may be determined because the system call(s) and the associated document is/are captured just before the document is exported, but after final edits have been made.

In an example, the deep scan of the document contents and/or its metadata is performed according to a policy condition. In an example, the policy condition is a chain of operations on Boolean-valued functions of keywords contained within a document. The keywords are policy eliciting terms (including their patterns), which can be single terms, compound terms, or a combination of terms. The policy-eliciting terms may be defined using the secure authoring tool 26 and broadly include any set of information, such as, classification levels, security labels, words, paragraphs, pages, symbols, phrases, patterns, data, tags, dates, logos, code, files, documents, and any other information that could be found in a document. Examples of policy-eliciting terms include the following: Confidential, Restricted, Private, Secure, Confidentiel (French), Prive (French); high-security, medium-security, low-security, level 0, level 1, credit-card numbers, social-security numbers, customer identifiers, a form, a template, workflow-eliciting terms, author, owner, creation date, modification date, parts of copyrighted works, a name/code-name of a new product, or the like.

To satisfy a policy condition, the document may be required to contain the specified policy eliciting terms simultaneously, as alternatives, or any combinations thereof. For example, to satisfy the following condition:

$$(("customer" \vee "client") \wedge ("contract" \vee "agreement"))$$

(where $\wedge$ denotes "AND" and $\vee$ denotes "OR") the document must simultaneously contain one word from the first group {"customer", "client"} and one from the other group {"contract", "agreement"}. Thus, a document containing "customer" and "agreement" satisfies this policy condition (the policy is applicable to the document), but a document containing neither "contract" nor "agreement" does not satisfy this policy condition (the policy is not applicable to the document). Statistical language processing (SLP) techniques (e.g., Levenshtein or Damerau-Levenshtein distances) may be used to provide fuzzy matching for these keywords to accommodate typo errors, including misspellings, such as wrong characters and swapped characters. For example, the following policy condition:

$$("contract"_{E=1} \wedge \neg "contact") \vee ("agreement"_{E=2})$$

requires a document to contain either i) the word contract, possibly misspelled with one error E=1, however the word shall not be contact or ii) the word agreement with no more than two errors E=2.

The policy decision engine 24 can be further extended to accommodate policy eliciting term stemming and lemmatization, which could render the policy decision engine 24 more robust in dealing with policy eliciting term inflections.

Still further, the policy decision engine 24 can be further extended to accommodate document metadata conditions. In these examples, Boolean-valued metadata conditions are added to the previously described content-based policy conditions using the corresponding Boolean operations. As an example of metadata, when a file with sensitive data is about to be saved, the intended destination may be one of the policy conditions. For example, if the destination is classified as a local hard drive or as another secure location, the document may be saved. However, if the destination is classified as an external device, the document may not be saved. As another example of metadata, when an email is about to be sent, the email address of the recipient may be one of the policy conditions. For example, it may be acceptable to send a confidential email to a coworker, but not to any email address that does not belong to the organization. As still other examples of metadata, when a file is about to be uploaded, the IP address of the server may serve as a policy condition, and when a document is about to be printed, the IP address of the printer or whether the printer is local may serve as policy conditions.

It is to be understood that the policy conditions may be associated with any property of the document and/or its metadata. As such, the policy conditions may be document-specific (e.g. keywords within the document itself), user-specific (e.g. email address of a recipient) or may be action-specific (e.g., saving destination).

In some of the examples disclosed herein, the determination of document sensitivity is made on the full document contents and/or metadata, and thus the scan is performed on each and every document part or the document as a whole, as required by the policy/policies. In other examples, the document "hot" areas (e.g., header, footer, first page, titles, etc.) may be analyzed alone or before analyzing the remainder of the document. For example, if a document header contains the label "Confidential", the policy decision engine 24 may not analyze the document body to make a decision; or may analyze the full document body and at least consider this tag when making a decision. The action of the policy decision engine 24 depends at least in part on the policy/policies being applied.

Each policy includes a policy action. The policy action to be taken is defined by the policy and is based on the current sensitivity level of the document. The policy decision engine 24 implements the policy based upon the document sensitivity (reference numeral 212 of FIG. 2).

The policy action may be implemented/executed using Microsoft Detours (i.e., a library for instrumenting arbitrary Win32 functions on x86, x64, and IA64 machines, it intercepts Win32 functions by re-writing the in-memory code for target functions and contains utilities to attach arbitrary DLLs and data segments to any Win32 binary), Microsoft Hooks (i.e., invokes a hook procedure that while, loadable kernel modulus (e.g., which may be deployed on Linus OS), or other suitable mechanisms. As will be described further below, the policy action may be to simply continue with the original system call, to simply deny the original system call, or to provide an alternate action in place of the original system call. The policy action may also include other actions, such as, securely logging the event, actively informing the user about the data leak detection by citing the corresponding policy, warning the user that his/her action is being denied because it will result in a data leak, guiding the user through alternate paths for data and/or document release (e.g. by requiring an explicit authorization, encryption, etc.)

If the scanning indicates that a document is sensitive and a policy breach may occur (e.g., policy conditions are met or indicate unsecure destinations), the policy action may be to deny/forbid the action or to provide an alternate action that will not result in data leakage. When the action is outright denied/forbidden, the user may be provided with clear information that the original action has not been allowed. For example, a pop-up window may appear indicating that the action is not allowed due to violation of a particular policy. Alternate actions may be provided to the user as an option or may automatically be executed when a potential policy breach by a particular application for a particular document is detected. Alternate actions include protection enforcing actions, mandatory document encryption, redirection to a secure printer or email address, redirection to a secure destination, or the like. Some specific examples of alternate actions include allowing saving or emailing to take place if encryption is used, allowing a confidential document to be emailed if the email address is changed to a company/enterprise address, and allowing printing to take place if a secure code is required to be entered at the printer. When an alternate action is available, the alternate actions may be presented to the user (via a client device interface, e.g., monitor, screen, etc.), and the system/program may guide the user through the alternate path(s).

If the results of scanning indicate that a document is not sensitive and a policy breach will not result (e.g., policy conditions are not met or indicate secure destinations), the policy action may be to allow the action to continue. In this example, the previously captured system call will be resumed. In these examples, the application is restored to the state it was in when it was suspended. When the action is suspended and subsequently allowed, the user may be informed that transmitting, saving, printing, etc. is in progress via a pop-up window or other on-screen indication.

The policy action(s) of a policy are defined using the secure authoring tool 26.

In some instances, the action that has been suspended will be blocked by default when the document associated with the action cannot be analyzed. For example, the document may not be in a supported format or may include an unknown character set. In such instances, the policy decision engine 24 may not be able to scan the document to determine its current sensitivity level. In such instances, in order to guarantee data leak prevention, the suspended action may be forbidden.

The following are examples of the four actions (i.e., save, email, upload, and print) that may be suspended, and the document analysis and resulting policy actions that may be implemented. These examples are meant to be illustrative and non-limiting.

Data leaks can occur when a sensitive file is saved in clear text onto an external device (e.g., a pen drive, USB key, an external hard drive), which is subsequently lost. The system call associated with the save file to external device action may be captured when the "save file to external device" request is input by a user. The save file to external device action is then suspended. For the save file to external device action, the policy metadata may be the path where the user wants to save the file, and the policy eliciting terms (which may be designed to recognize sensitive document contents) may be searched in the full document contents or only within specified areas, e.g., header, footer. In this example, the policy/policies might dictate that sensitive documents need to be encrypted when saved into an external device, or the policy/policies might forbid that the sensitive documents be saved onto an external device.

Data leaks can also occur when an email containing sensitive information or having a sensitive document attached thereto is sent to an unauthorized email address. The system call associated with the send email action may be captured when the "send email" request is input by a user. The send email action is then suspended. For the send email action, the policy metadata may be the email addresses of the recipients, and the policy eliciting terms (which may be designed to recognize sensitive document contents) may be searched in the email subject, body and attachments. In this example, the policy/policies might dictate that sensitive documents need to be removed from the email and/or that the email address needs to be changed to an authorized email address.

Data leaks can also occur when a document containing sensitive data is inadvertently uploaded to a public server. The system call associated with the upload action may be captured when the "upload document" request is input by a user. The upload document action is then suspended. For the upload document action, the policy metadata may be the IP address of the destination server, and the policy eliciting terms (which may be designed to recognize sensitive document contents) may be searched in the in the HTTP Post request body, and in the file name and content of any file defined in the post request. When the file is to be uploaded to a server owned/managed by other parties (outside of the user's organization), the policy/policies might dictate that documents containing sensitive information may not be uploaded to this server. When the file is to be uploaded to a secure server over a public network (whose packets may easily be intercepted), the policy/policies might dictate that these communications need to be encrypted.

Data leaks can also occur when a document containing sensitive data is sent to an unsecure printer, i.e., a printer located in the public domain or accessible by external customers as well as employees. The system call associated with the print action may be captured when the "print" request is input by a user. The print action is then suspended. For the print action, the policy metadata may be the IP address of the printer or whether the printer is local or not, and the policy eliciting terms (which may be designed to recognize sensitive document contents) may be searched in the PCL/PDF/Postscript file, once it has been parsed. If a printer is not classified as secure, the corresponding policy could be enforced by automatically enabling PIN retrieval or the job could be redirected to another (secure) printer or cancelled.

After the appropriate policy action is executed, the action will either have been denied or allowed with or without modification. In any instance, a user may continue working in the application 12, and a data leak that may have otherwise occurred will have been prevented.

Figure 5:
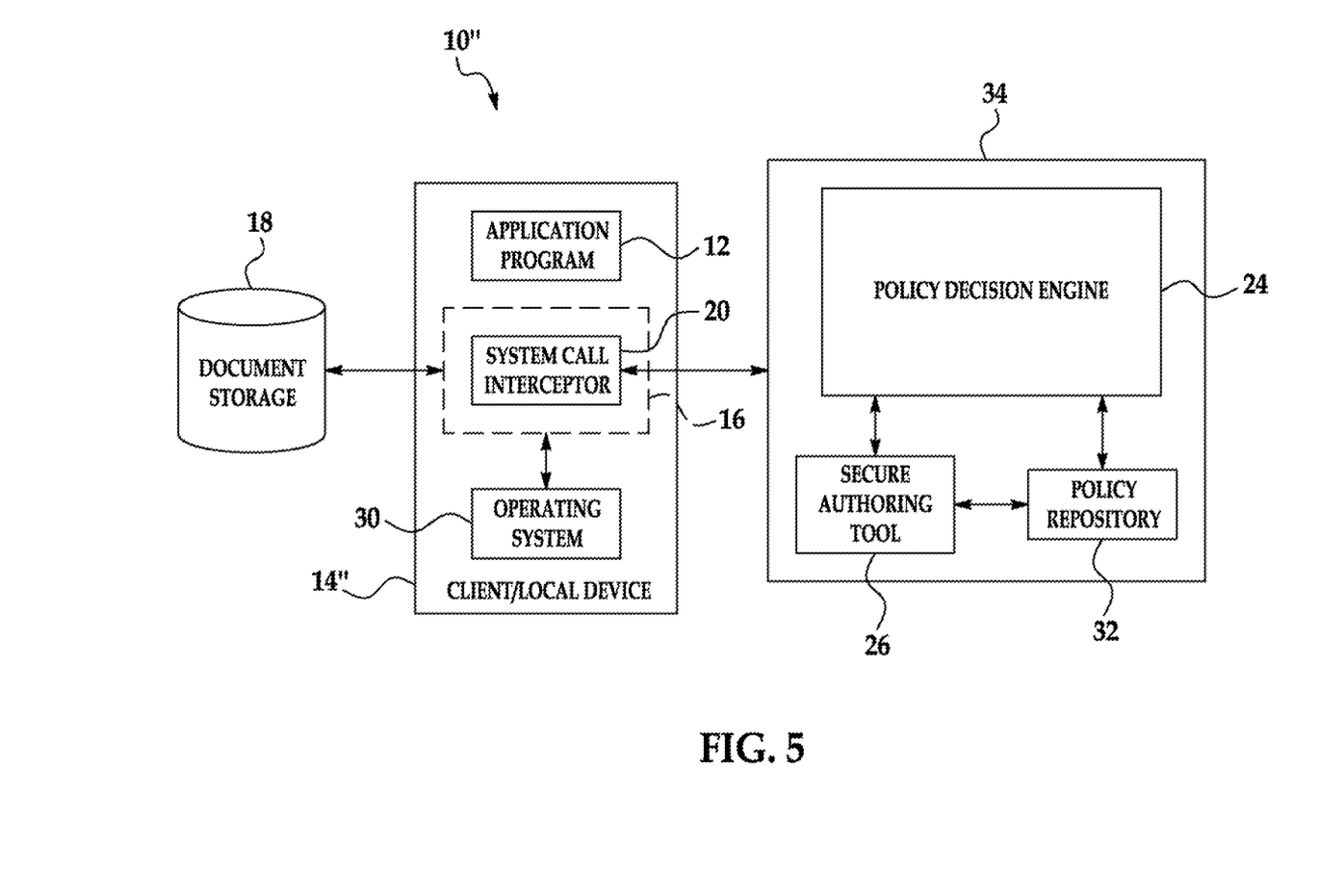
FIG. 5 is a schematic illustration of yet another example of a data leak prevention system.

The method(s) previously described may also be performed, for example using the system 10" shown in FIG. 5. In this example, the system call interceptor agent 16 resident on the client/local device 14" includes the interceptor 20, and the policy decision engine 24 is resident on some other trusted server/service 34 (which may be a central and/or distributed service to which the device 14" subscribes). In this example, the policy decision (i.e., analysis of document according to policy condition(s)) is outsourced to the trusted server/service 34. In this example, the trusted server/service 34 performs the policy decision and then transmits a signal back to the system call interceptor agent 16 instructing the application 12 on how to proceed in accordance with the policy action that should be initiated. This system 10" may be particularly suitable for small, limited capability devices (e.g., a smartphone). For example, the policy decision engine 24 may be complicated for small, limited capability devices 14", and so it may be more desirable to securely upload a captured document to some trusted server/service 34, analyze the document at the trusted server/service 34, and subsequently allow/forbid the action by transmitting a suitable signal back to the client device 14". Thus, for well-connected extra small capabilities devices, when a secure connection to the trusted service/server 34 can be reliably established when the action is attempted to be performed, it may be beneficial to outsource the decision to the server/service 34.

The following examples are provided to illustrate examples of the method of the present disclosure. It is to be understood that these examples are provided for illustrative purposes and are not to be construed as limiting the scope of the disclosure.

EXAMPLE 1

Notepad calls the system call WriteFile to save a file. Notepad saves a copy of the file in a temporary location on the local machine, it is analyzed, deleted, and then a decision is taken with the actual file that the user wanted to save. Microsoft Word has a more complicated mechanism to save files. Microsoft Word saves a temporary file using the WriteFile system call, it creates the doc/docx file in the location the user wanted to save it, and then its content is replaced by the temporary file calling ReplaceFile system call. Hence, the context aware system call is ReplaceFile.

To handle the different behaviors of these applications using the system and method disclosed herein, if WriteFile is called for a forbidden location (e.g., an external harddrive), the system call may be automatically blocked and the user may be notified. If, however, the location is allowed or is allowed under certain conditions, the WriteFile system call may be allowed. When the ReplaceFile is called, the action may be suspended, and a copy of the temporary document in a trusted local temporary folder may be made and analyzed. If the policy allows saving the document in the location the user specified, ReplaceFile is allowed and the process is over. If the document is not allowed in the location the user specified, Microsoft Word's temporary file is deleted and ReplaceFile is blocked. Microsoft Word may another attempt to save the file by calling WriteFile directly for the doc/docx document, but this WriteFile call may be blocked because the file extension is known.

Microsoft Excel also calls WriteFile for a temporary file and then ReplaceFile to put the content of the temporary file into the xls/xlsx file. However, if ReplaceFile is blocked as described above, the application does not attempt to save the file calling WriteFile directly for the xls/xlsx file. As such, for this application, WriteFile is not blocked.

EXAMPLE 2

For Microsoft Outlook, the event fnevObjectCreaetd (which is called when a MAPI object is saved) is utilized as the system call. This system call may be called when a calendar event or an email is about to be sent. The email subject, recipients, body and attachments may be analyzed according to one or more policies. If the email cannot be sent, RpcAsyncCompleteCall (Microsoft Outlook's closest system call for sending an email) is blocked. This is an example of capturing a content-aware system call for analysis (fnevObjectCreated) and blocking another system call (which is not used to extract information, but is the one that performs the "send email" action).

EXAMPLE 3

For uploading to Microsoft Internet Explorer, a BHO (Browser Help Object) may be created and the event BeforeNavigate2 (which is called just before every http request is sent) may be sunk. To handle this event, the request is analyzed according to the policy, and if there is a file name in the post sequence, that file is also analyzed. If the decided action is blocking the http request, "true" is returned because if the system call BeforeNavigate2 returns true, the http post message will not be sent. Otherwise, the value that BeforeNavigate2 would have returned if it had not been captured is returned, meaning that the natural behavior of the application continues unaltered.

EXAMPLE 4

The Universal Print Drive (UPD) may be used, which sends a file to the spooler, calling WritePrinter and WriteFile. For the print action, WriteFile may be captured, a copy of the file may be saved in a local temporary location and parsed (it is in PCL format), and then a decision is made in accordance with current policies. If the decision is to prevent the file from being printed, the WriteFile is blocked when it is called for the sensitive PCL file.

The system(s) and method(s) disclosed herein automatically prevent unauthorized data transmissions outside of a trusted environment by i) real-time capturing any action that triggers data export before the export has occurred, and ii) analyzing the corresponding document contents and metadata for potential policy breaches. The approaches described herein prevent data leakages and also provide immediate user feedback.

It is to be understood use of the words "a" and "an" and other singular referents include plural as well, both in the specification and claims.

While several examples have been described in detail, it will be apparent to those skilled in the art that the disclosed examples may be modified. Therefore, the foregoing description is to be considered non-limiting.

What is claimed is:

1. A data leak prevention system, comprising:
 a client device;
 an application resident on the client device, the application having source code that is unavailable or non-modifiable;
 a system call emittable by the application as a result of an action that is able to export a document out of the client device, the system call to take place before a data leak event can occur, and the action involving the document and i) latest full contents of the document, ii) metadata of the document, or iii) a combination of the latest full contents and the metadata;
 a system call interceptor agent resident on the client device, the system call interceptor agent including a system call interceptor to intercept the system call emitted by the application and to suspend the system call; and
 a policy decision engine to perform a deep scan, according to a policy condition, of at least some of i) the latest full contents of the document, ii) the metadata of the document, or iii) the combination of the latest full contents and the metadata to determine a real-time document sensitivity and to determine whether a policy applies to the document that is attempted to be exported out of the client device, and implement a policy action based upon the real-time document sensitivity.

2. The data leak prevention system as defined in claim 1, further comprising the policy received by the policy decision engine, wherein the policy includes an identifier, the action, the policy condition, and a set of policy actions including the policy action.

3. The data leak prevention system as defined in claim 2 wherein the policy decision engine runs computer readable instructions to:

capture i) the latest full contents of the document, ii) the metadata of the document, or iii) the combination of the latest full contents and the metadata after interception of the system call;

analyze the at least some of i) the latest full contents of the document, ii) the metadata of the document, or iii) the combination of the latest full contents and the metadata according to the policy condition, wherein the policy condition is a chain of operations on Boolean-valued functions of keywords contained within the document, Boolean-valued metadata conditions, or combinations thereof; and select and initiate the policy action from the set of policy actions in response to the analysis.

4. The data leak prevention system as defined in claim 1, further comprising a secure authoring tool in selective communication with the policy decision engine which selectively receives policies from the secure authoring tool, the secure authoring tool including computer readable instructions, embedded on a non-transitory, tangible computer readable medium, to any of i) add a new policy, ii) delete an existing policy, iii) modify an existing policy, iv) manage an existing policy, v) test a policy, or vi) view an existing policy.

5. The data leak prevention system as defined in claim 4, further comprising:
a policy server that is in selective communication with the secure authoring tool and the policy decision engine; and
a secure communication channel selectively connecting the policy server to a memory of the client device, wherein the memory is in communication with the policy decision engine.

6. The data leak prevention system as defined in claim 1 wherein the system call interceptor agent includes the policy decision engine resident on the client device.

7. The data leak prevention system as defined in claim 1 wherein the action is chosen from send email, save, autosave, print, upload, move, copy, and drag and drop.

8. The data leak prevention system as defined in claim 1 wherein the policy condition applies to the document, and the implemented policy action denies the action or remediates the action and thus prevents the document from being exported out of the client device.

9. The data leak prevention system as defined in claim 1 wherein the policy condition fails to apply to the document, and the implemented policy action allows the action to be performed and thus enables the document to be exported out of the client device.

10. A method for preventing data leaks, comprising:
analyzing system calls of an application, the application having source code that is unavailable or non-modifiable;
during the analysis, filtering at least one of the system calls that is identified as corresponding with a potential data leak event;
defining the filtered system call that corresponds with an action, that if fully executed, would export a document out of a client device that runs the application, wherein the action takes place before the potential data leak event can occur and involves the document;
assigning the defined, filtered system call to a set of system calls that are to be captured by a system call interceptor of the client device;
intercepting and automatically suspending, via the system call interceptor, the defined, filtered system call emitted by the application, thereby preventing execution of the action;
while the defined, filtered system call is suspended and via a policy decision engine of the client device, performing a deep scan of at least some of i) latest full contents of the document, ii) metadata of the document, or iii) a combination of i and ii according to a policy condition associated with the action to determine a real-time document sensitivity; and
via the policy decision engine, initiating a policy action based upon the real-time document sensitivity;
wherein each of the steps is performed by a processor running computer readable instructions embedded on a non-transitory, tangible computer readable medium.

11. The method as defined in claim 10 wherein automatically suspending prevents the document from being transmitted out of the client device.

12. The method as defined in claim 10 wherein performing the deep scan includes searching, via the policy decision engine, the at least some of i) the latest full contents of the document, ii) the metadata of the document, or iii) the combination of the latest full contents and the metadata to determine whether the policy condition applies to the document, wherein the policy condition is a chain of operations on Boolean-valued functions of keywords contained within the document, Boolean-valued metadata conditions, or combinations thereof.

13. The method as defined in claim 12 wherein performing the deep scan of the at least some of the latest full contents of the document includes analyzing a header, footer, first page, title, or combination thereof of the document as prescribed by the policy condition.

14. The method as defined in claim 12 wherein initiating the policy action includes denying the action or remediating the action when the policy condition applies to the document.

15. The method as defined in claim 12 wherein initiating the policy action includes allowing the action when the policy condition fails to apply to the document.

16. The method as defined in claim 10 wherein performing the deep scan reveals that the document satisfies multiple policy conditions, and wherein the method further comprises executing the policy action associated with the policy condition that has a higher designated priority.

17. A method for preventing data leaks, comprising:
running an application on a client device;
intercepting, via a system call interceptor of the client device, a defined, filtered system call emitted by the application which corresponds with a potential data leak event and with an action that, if fully executed, would export a document out of the client device;
automatically suspending, via the system call interceptor, the intercepted system call, thereby preventing the action from being executed;
while the system call is suspended and via a policy decision engine of the client device, performing deep content parsing of i) latest data incorporated into the document, ii) metadata of the document, or iii) a combination of the latest data and the metadata according to a policy condition associated with the action to determine a real-time document sensitivity and to determine whether a policy applies to the document that is attempted to be exported out of the client device; and
in response to the deep scan, and via the policy decision engine, initiating a policy action based upon the real-time document sensitivity;
wherein each of the steps is performed by a processor of the client device running computer readable instructions embedded on a non-transitory, tangible computer readable medium.

18. The method as defined in claim 17, wherein the policy condition is a chain of operations on Boolean-valued functions of keywords contained within the document, Boolean-valued metadata conditions, or combinations thereof.

19. The method as defined in claim 18 wherein the keywords are policy eliciting terms selected from the groups consisting of a classification level, a security label, a word, a paragraph, a page, a symbol, a phrase, a pattern, a tag, a date, a logo, and combinations thereof.

* * * * *